(12) United States Patent
Thorner

(10) Patent No.: US 8,328,638 B2
(45) Date of Patent: *Dec. 11, 2012

(54) METHOD AND APPARATUS FOR GENERATING TACTILE FEEDBACK VIA RELATIVELY LOW-BURDEN AND/OR ZERO BURDEN TELEMETRY

(76) Inventor: Craig Thorner, Jackson, NJ (US)

(*) Notice: Subject to any disclaimer, the term of this patent is extended or adjusted under 35 U.S.C. 154(b) by 1035 days.

This patent is subject to a terminal disclaimer.

(21) Appl. No.: 11/929,426

(22) Filed: Oct. 30, 2007

(65) Prior Publication Data

US 2008/0280678 A1    Nov. 13, 2008

Related U.S. Application Data

(63) Continuation of application No. 10/201,584, filed on Jul. 23, 2002, now abandoned, which is a continuation-in-part of application No. 08/935,762, filed on Sep. 23, 1997, now Pat. No. 6,422,941, which is a continuation-in-part of application No. 08/409,327, filed on Mar. 23, 1995, now Pat. No. 5,669,818, and a continuation-in-part of application No. 08/309,763, filed on Sep. 21, 1994, now Pat. No. 5,684,722.

(51) Int. Cl.
*A63F 13/02* (2006.01)
(52) U.S. Cl. ............ 463/30; 463/36; 463/37; 463/38; 463/46; 463/47
(58) Field of Classification Search ............ 463/1–6, 463/46, 47, 40–42, 33–35, 36–38, 48
See application file for complete search history.

(56) References Cited

U.S. PATENT DOCUMENTS

| 1,738,289 A | 12/1929 | Fletcher |
| 3,270,440 A | 9/1966 | Radosevic, Jr. |
| 3,397,352 A | 8/1968 | Woodward |
| 3,736,551 A | 5/1973 | Hirsch |
| 3,902,687 A | 9/1975 | Hightower |
| 3,919,691 A | 11/1975 | Noll |
| 3,983,640 A | 10/1976 | Cardullo et al. |
| 4,030,208 A | 6/1977 | Carver et al. |
| 4,081,829 A | 3/1978 | Brown |
| 4,218,702 A | 8/1980 | Brocard et al. |
| 4,237,449 A | 12/1980 | Zibell |
| 4,244,120 A | 1/1981 | Harris |

(Continued)

FOREIGN PATENT DOCUMENTS

DE    4400790 A1    5/1995

(Continued)

OTHER PUBLICATIONS

Gobel et al, "Tactile Feedback Applied to Computer Mice", International Journal of Human Computing Interacion.*

(Continued)

*Primary Examiner* — Ronald Laneau
*Assistant Examiner* — Ross Williams
(74) *Attorney, Agent, or Firm* — Ryan Alley Intellectual Property Law

(57) ABSTRACT

A method and a device for providing a tactile sensation are provided. The device includes a plurality of actuators. The plurality of actuators includes first and second actuators. The first actuator is adapted to provide a first tactile sensation, and the second actuator is adapted to provide a second tactile sensation.

20 Claims, 11 Drawing Sheets

U.S. PATENT DOCUMENTS

| | | |
|---|---|---|
| 4,257,062 A | 3/1981 | Meredith |
| 4,310,315 A | 1/1982 | Frank |
| 4,321,044 A | 3/1982 | Kron |
| 4,414,984 A | 11/1983 | Zarudiansky |
| 4,477,043 A | 10/1984 | Repperger |
| 4,484,191 A | 11/1984 | Vavra |
| 4,527,980 A | 7/1985 | Miller |
| 4,553,748 A | 11/1985 | Allen et al. |
| 4,560,983 A | 12/1985 | Williams |
| 4,574,391 A | 3/1986 | Morishima |
| 4,581,491 A | 4/1986 | Boothroyd |
| 4,604,016 A | 8/1986 | Joyce |
| 4,706,294 A | 11/1987 | Ouchida |
| 4,713,651 A | 12/1987 | Morag |
| 4,731,603 A | 3/1988 | McRae et al. |
| 4,771,344 A | 9/1988 | Fallacaro et al. |
| 4,779,615 A | 10/1988 | Frazier |
| 4,791,416 A | 12/1988 | Adler |
| 4,795,296 A | 1/1989 | Jau |
| 4,800,721 A | 1/1989 | Cemenska et al. |
| 4,823,634 A | 4/1989 | Culver |
| 4,855,822 A | 8/1989 | Narendra et al. |
| 4,856,078 A | 8/1989 | Konopka |
| 4,868,549 A | 9/1989 | Affinito et al. |
| 4,885,565 A | 12/1989 | Embach |
| 4,949,119 A | 8/1990 | Moncrief et al. |
| 4,965,559 A | 10/1990 | Dye |
| 4,983,901 A | 1/1991 | Lehmer |
| 4,988,981 A | 1/1991 | Zimmerman et al. |
| 5,035,242 A | 7/1991 | Franklin et al. |
| 5,044,956 A | 9/1991 | Behensky et al. |
| 5,076,517 A | 12/1991 | Ferranti et al. |
| 5,103,404 A | 4/1992 | McIntosh |
| 5,105,183 A | 4/1992 | Beckman |
| 5,107,262 A | 4/1992 | Cadoz et al. |
| 5,146,566 A | 9/1992 | Hollis, Jr. et al. |
| 5,165,897 A | 11/1992 | Johnson |
| 5,184,319 A | 2/1993 | Kramer |
| 5,184,956 A | 2/1993 | Langlais et al. |
| 5,185,561 A | 2/1993 | Good et al. |
| 5,186,629 A | 2/1993 | Rohen |
| 5,193,963 A | 3/1993 | McAffee et al. |
| 5,203,563 A * | 4/1993 | Loper, III ................. 273/148 B |
| 5,209,661 A | 5/1993 | Hildreth et al. |
| 5,220,260 A | 6/1993 | Schuler |
| 5,223,776 A | 6/1993 | Radke et al. |
| 5,240,419 A | 8/1993 | DeGyarfas |
| 5,269,687 A | 12/1993 | Mott et al. |
| 5,274,363 A | 12/1993 | Koved et al. |
| 5,275,565 A | 1/1994 | Moncrief |
| 5,277,584 A | 1/1994 | DeGroat et al. |
| 5,286,203 A | 2/1994 | Fuller et al. |
| 5,296,871 A | 3/1994 | Paley |
| 5,299,810 A | 4/1994 | Pierce et al. |
| 5,307,456 A | 4/1994 | MacKay |
| 5,320,538 A | 6/1994 | Baum |
| 5,327,120 A | 7/1994 | McKee et al. |
| 5,354,162 A | 10/1994 | Burdea et al. |
| 5,361,078 A | 11/1994 | Caine |
| 5,366,376 A | 11/1994 | Copperman et al. |
| 5,368,484 A | 11/1994 | Copperman et al. |
| 5,374,924 A | 12/1994 | McKiel, Jr. |
| 5,381,080 A | 1/1995 | Schnell et al. |
| 5,381,347 A | 1/1995 | Gery |
| 5,388,992 A | 2/1995 | Franklin et al. |
| 5,389,865 A | 2/1995 | Jacobus et al. |
| 5,396,266 A | 3/1995 | Brimhall |
| 5,399,091 A | 3/1995 | Mitsumoto |
| 5,405,152 A | 4/1995 | Katanics et al. |
| 5,414,337 A | 5/1995 | Schuler |
| 5,428,395 A | 6/1995 | Jeong |
| 5,451,924 A | 9/1995 | Massimino et al. |
| 5,459,477 A | 10/1995 | Fukuda et al. |
| 5,482,051 A | 1/1996 | Reddy et al. |
| 5,512,919 A | 4/1996 | Araki |
| 5,513,100 A | 4/1996 | Parker et al. |
| 5,513,129 A | 4/1996 | Bolas et al. |
| 5,513,130 A | 4/1996 | Redmond |
| 5,542,672 A | 8/1996 | Meredith |
| 5,551,701 A | 9/1996 | Bouton et al. |
| 5,553,148 A | 9/1996 | Werie |
| 5,559,432 A | 9/1996 | Logue |
| 5,565,840 A | 10/1996 | Thorner et al. |
| 5,576,727 A | 11/1996 | Rosenberg et al. |
| 5,583,478 A | 12/1996 | Renzi |
| 5,587,937 A | 12/1996 | Massie et al. |
| 5,589,828 A | 12/1996 | Armstrong |
| 5,589,854 A | 12/1996 | Tsai |
| 5,629,594 A | 5/1997 | Jacobus et al. |
| 5,631,861 A | 5/1997 | Kramer |
| 5,634,794 A | 6/1997 | Hildreth et al. |
| 5,642,469 A | 6/1997 | Hannaford et al. |
| 5,643,087 A | 7/1997 | Marcus et al. |
| 5,666,138 A | 9/1997 | Culver |
| 5,666,473 A | 9/1997 | Wallace |
| 5,669,818 A | 9/1997 | Thorner et al. |
| 5,684,722 A | 11/1997 | Thorner et al. |
| 5,691,898 A * | 11/1997 | Rosenberg et al. ............. 700/85 |
| 5,707,237 A | 1/1998 | Takemoto et al. |
| 5,709,219 A | 1/1998 | Chen et al. |
| 5,714,978 A | 2/1998 | Yamanaka et al. |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,754,023 A | 5/1998 | Roston et al. |
| 5,755,577 A | 5/1998 | Gillio |
| 5,767,839 A | 6/1998 | Rosenberg |
| 5,781,172 A | 7/1998 | Engel et al. |
| 5,784,052 A | 7/1998 | Keyson |
| 5,790,108 A | 8/1998 | Salcudean et al. |
| 5,802,318 A | 9/1998 | Murray et al. |
| 5,803,738 A | 9/1998 | Latham |
| 5,805,140 A | 9/1998 | Rosenberg et al. |
| 5,807,177 A | 9/1998 | Takemoto et al. |
| 5,816,823 A | 10/1998 | Naimark et al. |
| 5,825,308 A | 10/1998 | Rosenberg |
| 5,857,986 A | 1/1999 | Moriyasu |
| 5,865,624 A | 2/1999 | Hayashigawa |
| 5,889,670 A | 3/1999 | Schuler et al. |
| 5,889,672 A | 3/1999 | Schuler et al. |
| 5,897,437 A | 4/1999 | Nishiumi et al. |
| 5,904,724 A | 5/1999 | Margolin |
| 5,921,780 A | 7/1999 | Myers |
| 5,944,151 A | 8/1999 | Jakobs et al. |
| 5,956,046 A | 9/1999 | Kehlet et al. |
| 5,959,613 A | 9/1999 | Rosenberg et al. |
| 5,973,670 A | 10/1999 | Barber et al. |
| 5,980,255 A | 11/1999 | Mathieu et al. |
| 5,986,643 A | 11/1999 | Harvill et al. |
| 6,004,134 A * | 12/1999 | Marcus et al. ................. 434/45 |
| 6,036,495 A | 3/2000 | Marcus et al. |
| 6,046,709 A | 4/2000 | Shelton et al. |
| 6,088,017 A | 7/2000 | Tremblay et al. |
| 6,104,158 A | 8/2000 | Jacobus et al. |
| 6,139,324 A | 10/2000 | Roy et al. |
| 6,184,868 B1 | 2/2001 | Shahoian et al. |
| 6,198,206 B1 | 3/2001 | Saarmaa et al. |
| 6,211,861 B1 | 4/2001 | Rosenberg et al. |
| 6,232,932 B1 | 5/2001 | Thorner |
| 6,275,213 B1 | 8/2001 | Tremblay et al. |
| RE37,374 E | 9/2001 | Roston et al. |
| 6,394,904 B1 | 5/2002 | Stalker |
| 6,422,941 B1 | 7/2002 | Thorner et al. |
| 6,424,333 B1 | 7/2002 | Tremblay et al. |
| 6,550,565 B2 | 4/2003 | Thomas et al. |
| 6,693,622 B1 | 2/2004 | Shahoian |
| 6,714,045 B2 | 3/2004 | Potter et al. |
| 6,752,716 B1 | 6/2004 | Nishimura et al. |
| 6,827,579 B2 | 12/2004 | Burdea et al. |
| 6,864,877 B2 | 3/2005 | Braun et al. |
| 2001/0036868 A1 | 11/2001 | Roy et al. |

FOREIGN PATENT DOCUMENTS

| | | |
|---|---|---|
| EP | 0085518 A1 | 8/1983 |
| EP | 0265011 A1 | 4/1988 |
| EP | 0349086 A1 | 1/1990 |

| EP | 0626634 A2 | 5/1994 |
| EP | 0607580 A1 | 7/1994 |
| GB | 2254911 A | 10/1992 |
| JP | 62194389 | 12/1987 |
| JP | 4008381 | 1/1992 |
| JP | 06210065 | 8/1994 |
| JP | 07084515 | 3/1995 |
| WO | WO-92/00559 | 1/1992 |
| WO | WO-96/09695 | 3/1996 |
| WO | WO-01/03105 A1 | 1/2001 |

OTHER PUBLICATIONS

U.S. Appl. No. 95/000,093, filed May 17, 2005, Immersion Corp.
U.S. Appl. No. 95/000,094, filed May 19, 2005, Immersion Corp.
U.S. Appl. No. 09/608,125, filed Jun. 30, 2000, Schena.
U.S. Appl. No. 09/669,029, filed Sep. 25, 2000, Goldenberg.
"Logitech, Inc., Cyberman 3d Controller Data Sheet," Copyright 1993.
"Tactile Transducer for Deaf Computer and Typewriter Users", *Research Disclosure*, No. 324, (Apr. 1991),p. 280.
"*Immersion Corp. v. Sony Computer Entertainment America, Inc.*", 2006 U.S. Dist. LEXIS 13697 (N.D. Cal Mar. 8, 2006).
"*Immersion Corp., v. Sony Computer Entertainment America, Inc.*", 2005 U.S. Dis. LEXIS 4781 (N.D. Cal. Mar. 24, 2005).
Defendant Sony's Motion for Relief Under Fed. R. Civ. P. 60lb) for Relief from Final Judgment, *Immersion v. Sony*, 2006 U.S. Dist. LEXIS 13697 (N.D. Cal. 2005) (No. C 02-0710 CW).
Immersion Corp's Opposition to Defendants Motion Under Fed. R. Civ. p. 60(b) for Relief from Final Judgment, *Immersion v. Sony*, 2006 U.S. Dist. LEXIS 13697 N.D. Cal. 2005) (No. C02-0710 CW).
Defendants Reply Brief in Support of Motion Under Fed. R. Civ. P. 60(b) for Relief from Final Judgment, *Immersion v. Sony*, 2005 U.S. Dist. Ct. Motions LEXIS 15026 (N.D. Cal. 2005) (No. C02-0710 CW (WDB)).
Microsoft's Claim Construction Brief at p. 8, *Immersion v. Sony*, 2003 U.S. Dist. Ct. Motions LEXIS 9817, (N.D. Cal 2003) (No. C02-0710 CW (WDB)).
Appelant's Reply Brief at pp. 35-37, *Immersion v. Sony*, 2006 U.S. Fed. Cir. Briefs LEXIS 36 (C.A.F.C. 2006) (Nos. 05-1227, 05-1358, 05-1441).
Craig A. Thorner Dep, *Immersion v. Sony*, Case No. C02-0710, Sep. 15, 2005-Sep. 26, 2005.
Declaration and Rebuttal Declaration of Craig A. Thorner, *Immersion Corp., v. Sony Computer Entertainment America, Inc.*, C02-0710, Sep. 2, 2005.
"The Electrical Engineering Handbook", *Dorf. ed.*, (1993),pp. 708-713.
*Logitech, Inc., CyberMan 3D Swift Supplement*, Version 1.0a, revised Feb. 10, 1994.
Roehl, B. "Hardware Review, The Logitech CyberMan", *VR World*, (Jan./Feb. 1995),pp. 58-59.
VREAM Inc. "VREAM Virtual Reality Development System Reference Manual 1.0", (1993),pp. 1-141 and 1-147 to 1-148.
VREAM Inc. "VREAM Virtual Reality Development System User's Guide 1.0", (1993),pp. 4-8; 5-20 and 5-21; and 9-23.
"USPTO Non-Final Office Action mailed Sep. 17, 2009 in U.S. Appl. No. 10/201,584", 10 pgs.
Document 149-3. 16 pages. White Ex. C Case 3:09-cv-01894-GEB-DEA.
Document 149-4. 7 pages. White Ex. D Case 3:09-cv-01894-GEB-DEA.
Document 151-0. 31 pages. Sony's Responsive Markman Brief Case 3:09-cv-01894-GEB-DEA.
Document 151-1. 28 pages. Certification of White Case 3:09-cv-01894-GEB-DEA.
Document 152-0. 12 pages. VRF's Responsive Markman Brief Case 3:09-cv-01894-GEB-DEA.
Document 152-1. 2 pages. Affidavit of Service Case 3:09-cv-01894-GEB-DEA.
Document 154. 13 pages. Memorandum Opinion Case 3:09-cv-01894-GEB-DEA.
Document 155. 3 pages. Markman Hearing Order Case 3:09-cv-01894-GEB-DEA.
Document 157. 3 pages. Signed Stipulation Closing Case Case 3:09-cv-01894-GEB-DEA.
Document 158. 3 pages. Notice of Appeal Case 3:09-cv-01894-GEB-DEA.
United States District Court—Case 3:09-cv-01894-MLC-DEA Document 175, 175-1, 175-2, 175-3, 175-4 Filed Jun. 4, 2012 pp. 1-125.
Document "11-1114.pdf". 12 pages. Appeal Decision. Precedential. United States Court of Appeals for the Federal Circuit. Vacate and Remand of Case 3:09-cv-01894-GEB-DEA.
United States District Court—Case 3:09-cv-01894-MLC-DEA Document 172 Filed May 4, 2012 pp. 1-104.
United States District Court—Case 3:09-cv-01894-MLC-DEA Document 172 Filed May 4, 2012 pp. 105-299.
Document 147-0. 31 pages. VRF's Markman Brief Case 3:09-cv-01894-GEB-DEA.
Document 147-1. 2 pages. McAndrews Decl. Case 3:09-cv-01894-GEB-DEA.
Document 147.2. 62 pages. McAndrews Decl. Ex A Case 3:09-cv-01894-GEB-DEA.
Document 147.3. 10 pages. McAndrews Decl. Ex B Case 3:09-cv-01894-GEB-DEA.
Document 147-4. 29 pages. McAndrews Decl. Ex C Case 3:09-cv-01894-GEB-DEA.
Document 147.5. 11 pages. McAndrews Decl. Ex D Case 3:09-cv-01894-GEB-DEA.
Document 148. 35 pages. Sony's Markman Brief Case 3:09-cv-01894-GEB-DEA.
Document 149-0. 1 page. Certification of White Case 3:09-cv-01894-GEB-DEA.
Document 149-1. 62 pages. White Ex. A Case 3:09-cv-01894-GEB-DEA.
Document 149-2. 10 pages. White Ex. B Case 3:09-cv-01894-GEB-DEA.
Document 160. 2 pages. Notice of Docketing Case 3:09-cv-01894-GEB-DEA.
Document 500. 4 pages. Designation of Materials Case 2011-1114 United States Court of Appeals for the Federal Circuit.
Document 501. 164 pages. Brief of Appellants Case 2011-1114 United States Court of Appeals for the Federal Circuit.
Document 502. 41 pages. Response Brief of Appellees Case 2011-1114 United States Court of Appeals for the Federal Circuit.
Document 503. 12 pages. Reply Brief of Appellants Case 2011-1114 United States Court of Appeals for the Federal Circuit.
Document 600. 91 pages. Markman Hearing Transcript Case 3:09-cv-01894-GEB-DEA.

* cited by examiner

QUADRANT 1
0 to 90 degrees

QUADRANT 1 SCALING FACTOR CALCULATION:

(step 1) take BANK VALUE IN DEGREES minus 0 yields a number 0 to 90
(step 2) then divide by 90 yields a number 0.000 to 1.000
(step 3) then add 1 to get the BANK SCALING FACTOR between 1.000 and 2.000

IN QUADRANT 1, APPLY BANK SCALING FACTOR OF 1.000 to 2.000 AS FOLLOWS:

(step 4) RIGHT LEG = RIGHT LEG divided by BANK SCALING FACTOR
(step 5) LEFT LEG = LEFT LEG multiplied by BANK SCALING FACTOR

QUADRANT 2
90 to 180 degrees

QUADRANT 2 SCALING FACTOR CALCULATION:

(step 1) take BANK VALUE IN DEGREES minus 90 yields a number 0 to 90
(step 2) then divide by 90 yields a number 0.000 to 1.000
(step 3) then add 1 to get the BANK SCALING FACTOR between 1.000 and 2.000

IN QUADRANT 2, APPLY BANK SCALING FACTOR OF 1.000 to 2.000 AS FOLLOWS:

(step 4) RIGHT LEG = RIGHT LEG divided by BANK SCALING FACTOR
(step 5) LEFT LEG = LEFT LEG multiplied by BANK SCALING FACTOR

QUADRANT 4
270 to 360 degrees

QUADRANT 4 SCALING FACTOR CALCULATION:

(step 1) take BANK VALUE IN DEGREES minus 270 yields a number 0 to 90
(step 2) then divide by 90 yields a number 0.000 to 1.000
(step 3) then add 1 to get the BANK SCALING FACTOR between 1.000 and 2.000

IN QUADRANT 4, APPLY BANK SCALING FACTOR OF 1.00 to 2.00 AS FOLLOWS:

(step 4) RIGHT LEG = RIGHT LEG multiplied by BANK SCALING FACTOR
(step 5) LEFT LEG = LEFT LEG divided by BANK SCALING FACTOR

QUADRANT 3
180 to 270 degrees

QUADRANT 3 SCALING FACTOR CALCULATION:

(step 1) take BANK VALUE IN DEGREES minus 180 yields a number 0 to 90
(step 2) then divide by 90 yields a number 0.000 to 1.000
(step 3) then add 1 to get the BANK SCALING FACTOR between 1.000 and 2.000

IN QUADRANT 3, APPLY BANK SCALING FACTOR OF 1.000 to 2.000 AS FOLLOWS:

(step 4) RIGHT LEG = RIGHT LEG multiplied by BANK SCALING FACTOR
(step 5) LEFT LEG = LEFT LEG divided by BANK SCALING FACTOR

METHOD AND APPARATUS FOR GENERATING TACTILE FEEDBACK VIA RELATIVELY LOW-BURDEN AND/OR ZERO BURDEN TELEMETRY

RELATED APPLICATION DATA

This application is a continuation of U.S. patent application Ser. No. 10/201,584, now abandoned which is a continuation-in-part of U.S. patent application Ser. No. 08/935,762 Filed Sep. 23, 1997 (assigned U.S. Pat. No. 6,422,941 set to issue on Jul. 23, 2002), which is a continuation-in-part of Ser. No. 08/409,327, now U.S. Pat. No. 5,669,818 (filed Mar. 23, 1995, issued Sep. 23, 1997) and Ser. No. 08/309,763, now U.S. Pat. No. 5,684,722 (filed Sep. 21, 1994, issued Nov. 4, 1997). All teachings of the parent applications and/or patents are incorporated herein by reference.

FIELD OF THE INVENTION

This invention relates to tactile feedback systems for computer and video game, simulation, and training systems, and, more particularly, to a method for using telemetry to generate and/or shape the tactile feedback generated by said systems, such that real-time tactile feedback is provided to enhance a user's or spectator's experience while interacting with said systems, and at a zero burden or a heretofore impossibly low burden to software developers, yet producing very effective results.

BACKGROUND OF THE DISCLOSURE

The implementation of tactile feedback in computer gaming, simulation, and training systems, where "tactile feedback" refers to physical sensations that one feels while interacting with said systems, has heretofore been plagued by the fundamental limitation of poor developer support. Typically, software developers are pressed for both time and money, and they are under constant pressure to release their software into the marketplace as soon as is practicable. In this competitive field, it is difficult for any given developer to spend the time necessary to create thoughtful and artistic tactile feedback. With regard to tactile feedback, proper implementation is more of an art than a science. No right or wrong answer necessarily exists for how a particular tactile event should feel, such as driving a car on gravel or firing a fictional laser cannon in a fictional spacecraft. Therefore, much time can be spent (and from the developer's point of view, even wasted) in tweaking the subjective feel of the desired effects, ad infinitum. In the end, there is a vast difference between the quality of tactile feedback that was merely implemented into a given software application, and tactile feedback that was thoughtfully and artistically crafted to render effective results (given of course the limitations of the particular tactile feedback hardware in use). In cases where the code that renders tactile feedback is incorporated by any given developer into that developer's wares, it is difficult for that code to be upgraded at a later time once a given product is released, because developers are usually fighting the time constraints of the post-release cycle where updates to some given software are periodically released to fix bugs or add features that were left out of the original release (or are functioning with substantial deficits) due to time constraints in effect during the prerelease period. Ultimately, servicing the tactile feedback support is less than a priority to the developer, and the effectiveness of said tactile feedback suffers as a result. Furthermore, given the subjective nature of tactile feedback, its effectiveness and quality varies greatly in each title, application, and/or implementation.

With regard to the patent applications and patents for which this application is a continuation-in-part, much of the difficulty presented by lack of developer support has been overcome by AudioSense®, which is a sound analysis technology that generates tactile feedback in real time without developer support of any kind. However, AudioSense® has inherent limitations that are overcome and/or minimized by intelliVIBE®, which is the type of tactile feedback that has typically required developer support—and therefore, intelliVIBE® suffers from the very limitations described previously herein.

Until the innovation that is the subject matter of this patent application, software developers were relied upon to decide what events in their software required what sensations, and what the triggering mechanisms were for initiating those sensations. For example, Immersion Corporation of 801 Fox Lane, San Jose, Calif. 95131 USA (NASDAQ: IMMR) markets and licenses technologies collectively falling under the trademark name TouchSense™. In using TouchSense™, developers can utilize a toolkit known as "Immersion Studio" (as of this writing, currently in version 4.1.0). When using Immersion Studio, developers can more easily create tactile effects, but are relied on to determine the subjective artistic tactile feel of those effects, and when such effects are to be rendered. This is precisely the burden that this patent application is intended to relieve.

Therefore, a need exists in the art for a relatively quick and simple method by which any given software developer is required only to activate a simple shared data structure, which will provided real-time telemetry to an external executable, application, function, or code segment (known to the present invention as an "intelliVIBE® module"), which in turn will itself generate the necessary tactile feedback control signals via general purpose algorithms that are shaped by said telemetry, thereby relieving the developer of the most substantial burdens of supporting an interface such as intelliVIBE®, and/or Immersion Corporation's TouchSense™, and/or any other proprietary methodology for generating tactile feedback. For reference, throughout this application, the terms "tactile feedback" should be understood to include and be synonymous with the terms "force feedback". In much the same way that AudioSense® audio analysis technology allows tactile feedback hardware to function with no support whatsoever from any given developer of any given software title, application, or hardware system, this telemetry based method allows intelliVIBE® (and other similar interfaces) to self-generate effective and thoughtful tactile feedback with minimal, simple, and one-time-only support by any given developer. Furthermore, due to the telemetry basis for the tactile feedback, the teachings herein can be applied to other areas, such as remotely piloted vehicles, remotely controlled vehicles, UA Vs (Unmated Aerial Vehicles), spacecraft, and other types of tele-operated or tele-presense vehicles, where telemetry is available or can be provided, thereby producing effective tactile feedback for the operators or spectators of such vehicles.

SUMMARY OF TITLE INVENTION

The present invention provides a method and corresponding apparatus for providing tactile feedback for computer and video game, training, and simulation systems. More specifically, the tactile feedback system comprises a software application, a tactile feedback controller, and a plurality of tactile sensation generators. The innovative method herein provides that any given software application can provide simple telemetry about its current state to a shared memory data structure, and subsequently leave all the burden of producing tactile feedback to an externally operating thread that employs general purpose algorithms and graphically adjustable scaling factors and configuration options to yield effective and appropriate tactile feedback without further effort by the given software application. It is a simple one-time only operation for any given software developer to implement the telemetry support. Thusly, the tactile feedback so produced is achieved with very low burden to the software developer. Additionally, should no telemetry be provided by a given software application, the innovative method herein has the means to self-generate its own telemetry by examining the state of the host computer's control input devices (i.e., keyboard, mouse, joystick, etc.), and to use said self-generated telemetry as the basis for applying real-time directional scaling to tactile feedback simultaneously produced via real-time audio analysis. The present invention can produce tactile feedback via the combination of real-time audio analysis with simultaneous directional scaling produced by real-time self-generated telemetry in combination with pre-defined general purpose algorithms. This capability is achieved at a zero burden, that is, with no effort whatsoever nor any acknowledgement of its existence from the perspective of the developers of any given software application, yet yields results that resemble very carefully and thoughtfully crafted tactile feedback.

More specifically, the tactile feedback method and apparatus is provided in a preferred embodiment comprised by (1) a software application (currently known as the Tactile Feedback System Control Panel or TFS Control Panel), which configures the Tactile Feedback System (TFS) and handles the intelliVIBE® modules, each of which is adapted to handle the telemetry provided by any given software title, application, or system, and provides a graphical user interface for adjusting the available tactile feedback parameters that descend from the provided telemetry, (2) a tactile feedback controller (the presently preferred embodiment is currently known as the TFS2 (Tactile Feedback System version 2.0) which incorporates cooperative AudioSense® and intelliVIBE® capabilities, and (3) a plurality of tactile sensation generators, the currently preferred embodiment of which is a tactile feedback seat known as the TFSU (Tactile Feedback Seating Unit) and a tactile feedback vest (U.S. Pat. No. 5,565, 840) known by the trademark name FLAKjaket™.

BRIEF DESCRIPTION OF THE DRAWINGS

The teachings of the present invention can be readily understood by considering the following detailed description in conjunction with the accompanying drawings, in which:

FIG. 5G depicts the graphical controls of FIG. 5, specifically illustrative HOTKEYS telemetry scaling factors;

FIG. 5H depicts the graphical controls of FIG. 5, specifically illustrative AFTERBURNER telemetry scaling factors;

FIG. 7 depicts the actual mathematical algorithm used to generate an aircraft's roll scaling factor based upon the aircraft's current quadrant as in FIG. 6, and how to utilize said scaling factor once derived from the roll telemetry data;

To facilitate understanding, identical reference numerals have been used, where possible, to designate identical elements that are common to the figures.

DETAILED DESCRIPTION OF THE DRAWINGS

Figure 1:
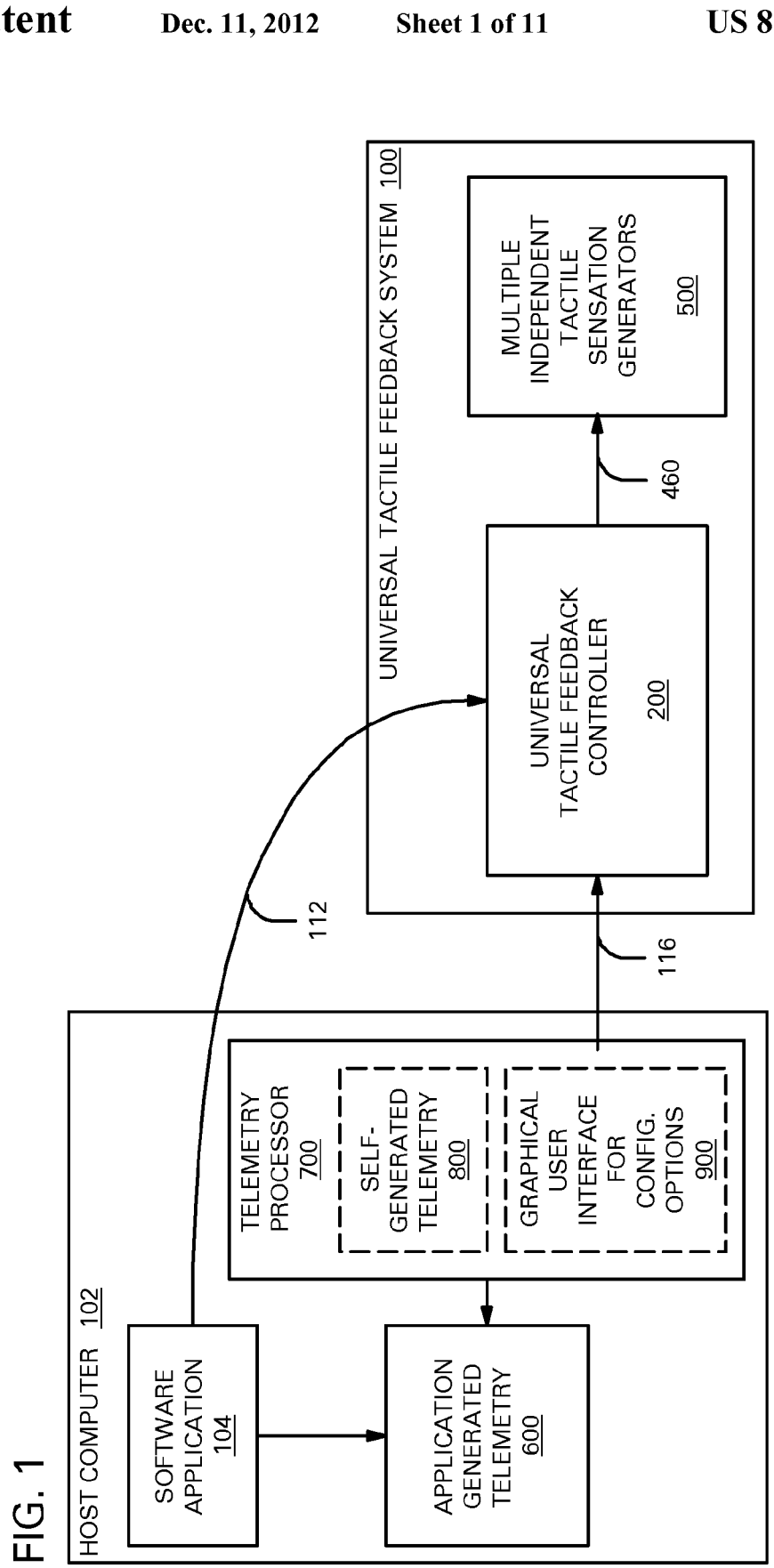
FIG. 1 depicts a block diagram of an illustrative configuration of the present invention.

FIG. 1 depicts a block diagram of a universal tactile feedback system 100 interacting with a host computer 102. The host computer 102 is connected to the universal tactile feedback controller 200 by an audio connection 112 and/or digital connection 116. The universal tactile feedback controller 200 is connected to multiple independent tactile sensation generators 500 by connection 460. The tactile sensation generators 500 collectively refer to hardware that produces physical sensations that one can feel while interacting with the software application 104. In this illustrative embodiment, no specific limitation is intended for any or all of the connections 112, 116,460 with regard to their particular form, whether analog, digital, wired, wireless, and so on. The host computer 102 is presumed to be the host for some desired software application 104. The software application 104 is the application for which the present invention will generate tactile feedback. If the developers of the given software application 104 have supported the simple telemetry requirement, there will exist application generated telemetry 600. This application-generated telemetry 600 is a simple data structure that contains information about the state of operation of said software application 104. For example, if the software application 104 is a car racing simulation or car racing game, typical telemetry would include the car's engine RPM, the car's MPH, the car's throttle position, lateral G-forces, acceleration, deceleration, brake pedal position, steering wheel deflection, current gear, surface type (i.e., is the car currently on asphalt, dirt, gravel, sand, wet asphalt, icy asphalt, snow, mud, etc.), and damage flags (i.e., are there any flat tires, deformations of the vehicle's body panels, or equipment failures, etc.). This illustrative telemetry is by no means comprehensive, but should be sufficient to illustrate the type of data common to car racing games and/or simulations. It is easy for developers to provide this type of telemetry because they already calculate these variables (and most often many more variables than these) to make their software function properly. Each different game or simulation will have a unique set of telemetry data. The telemetry is entered into a shared data structure by a common memory mapping technique readily understood by those skilled in the art. In the illustrative embodiment, the computer host is running on a Microsoft Windows platform wherein a predetermined shared memory area name is agreed and known to both the software application 104 and the telemetry processor 700. The software application 104 creates the telemetry area by opening a shared memory area with the predetermined shared memory are name. The telemetry processor detects the shared memory area by said predetermined name, and uses the standard Windows coding "Map View Of File" to map the application-generated telemetry 600 into the memory of the telemetry processor 700. This simple operation affords the telemetry processor 700 access to the real-time state data (telemetry) of the software application 104. In short, it allows the telemetry processor 700 to know what is going on inside the software application 104, to the extent and detail inherent in the data structure provided by the software application 104 for the benefit of the application generated telemetry 600 shared memory structure, and ultimately for the benefit of the owners of the universal tactile feedback system 100 and the users of the software application 104. Providing the application generated telemetry 600 is a very simple operation for any reasonably skilled software developer, and even if new to the entire concept, most often it is a process of only several tens of minutes to effectuate the shared memory area once the data structure that is to be mapped there is known.

Continuing with FIG. 1, if a given software developer does not provide the necessary application generated telemetry 600, the telemetry processor 700 can examine the state of the host computer 102 in real time and generate useful telemetry by eavesdropping on the state of the host computer's 102 keyboard, mouse, joystick, and the like. This raw self-generated telemetry 800 is an effective substitute for application-generated telemetry; however, the application-generated telemetry is much preferred if it is available. When there is no application generated telemetry available, the universal tactile feedback system runs in its host-independent audio analysis mode of operation, which is known by the registered trademark name AudioSense® (U.S. Trademark Registration Number 2261526, registered Jul. 14, 1999). In this case, AudioSense® autonomously generates useful "base level" tactile feedback, which is then "directionally scaled" by the self-generated telemetry 800 that is culled by the telemetry processor 700 from the host computer 102. AudioSense® has no capabilities as of this writing to apply left, and/or right, and/or front, and/or back directional scaling based upon its audio analysis. While an effective technology, it is greatly enhanced by directional scaling from self-generated telemetry 800. The presumption is that if the software application 104 provides application-generated telemetry 600 for the benefit of the telemetry processor, most often AudioSense® will ideally be disabled while such telemetry is available. However, AudioSense® can work simultaneously and cooperatively with application generated telemetry 600 as well, sometimes lending an "analog flavor" to the tactile feedback produced by the universal tactile feedback system 100.

Further in FIG. 1, the telemetry processor 700 provides a graphical user interface 900 for configuring and adjusting the way the available telemetry is utilized. The telemetry processor 700 is itself a software application that manages the available telemetry and performs the processing that converts said telemetry into a useful data stream for generating and/or shaping tactile feedback. More detail will be provided on this later in this disclosure.

Figure 2:
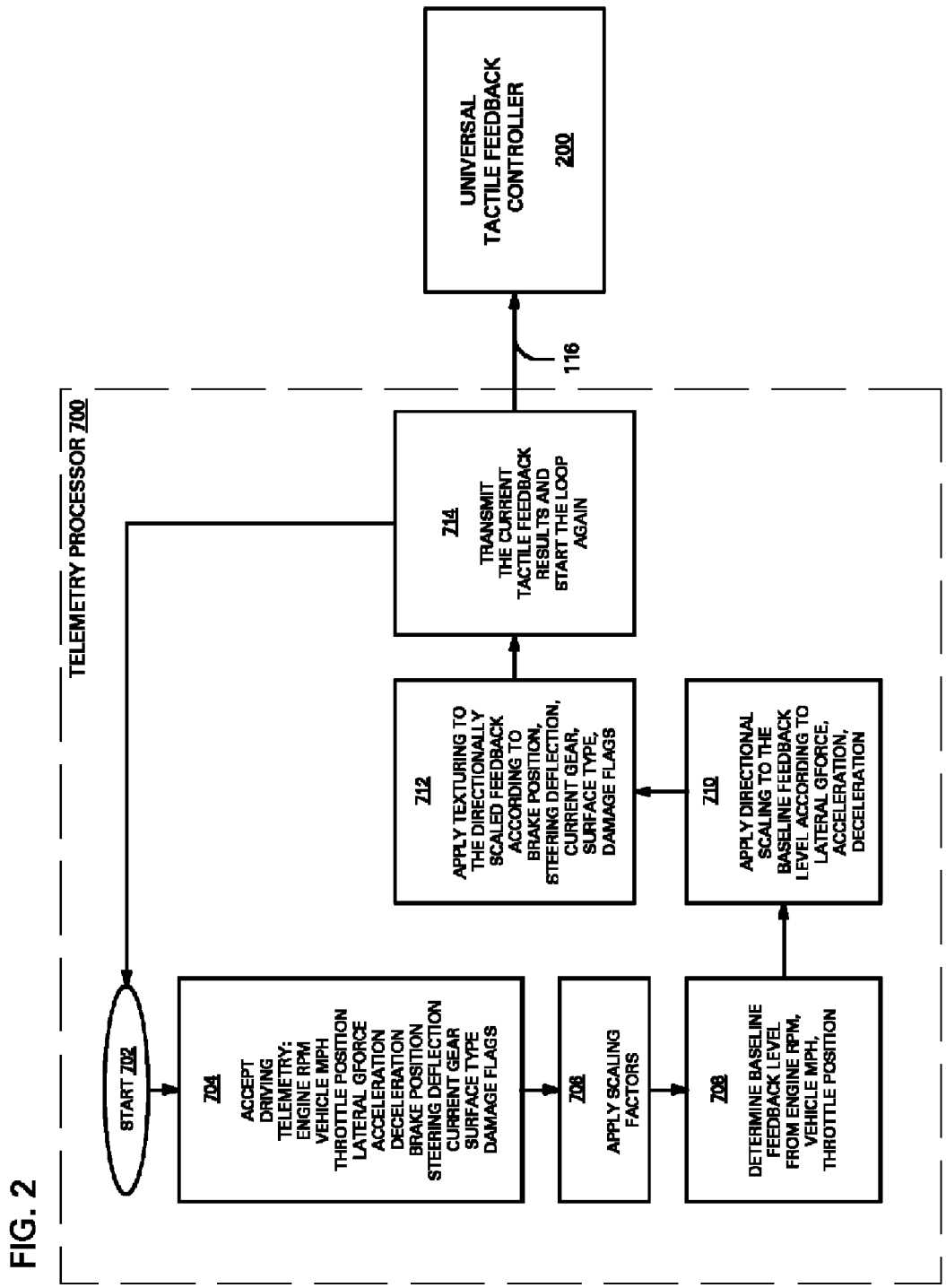
FIG. 2 is a flow chart for using illustrative application generated telemetry to generate tactile feedback for a driving simulation.

Continuing on to FIG. 2, an illustrative flow chart is shown wherein the telemetry processor 700 will process telemetry from a typical car based game or simulation. The telemetry processor 700 begins at the START 702. In step 704, the telemetry processor 700 accepts the telemetry via a shared memory mapped data structure. In the illustrative data set, the telemetry processor 700 is given the following illustrative values: the simulated car's engine RPM, vehicle MPH, throttle position, lateral g-force, forward acceleration and deceleration, the car's brake position, the car's steering wheel deflection, the current transmission gear, the surface type that the vehicle is currently on, and damage flags that might indicate various damage typical of cars, such as flat tires, body damage, engine failure, transmission failure, and the like. All of the received telemetry is in a "raw" state, that is, in a format native to the software application 104 that generated it. In step 706, scaling factors are applied to "normalize" the telemetry. For example, in one car simulation, the engine might idle at 700 RPM and might redline at 5500 RPM. However, in another car simulation, the engine might idle at 1500 RPM and redline at 9000 RPM. A specific constant RPM scaling factor might be used to always scale the RPM range for any given simulated car to a range of o to 100, and then, a baseline constant may be added, for example, 20. This would mean as long as the engine is started, the lowest scaled RPM value would be 0+20, or 20, where the highest RPM value would be 100+20, or 120. In this way, the "raw" telemetry will have been scaled into a useful range of 20 to 120. If the raw RPM value is 0, however, the baseline RPM constant +20 would be skipped, thereby leaving the RPM at O. In this way, a useful RPM value is created. Now, once the initial scaled RPM value is rendered, another scaling layer is applied from a graphical user interface 900 that is provided by the telemetry processor 700. The graphical user interface 900 allows the user to make the RPM value more or less prevalent in the tactile feedback that is perceived. Typically, the RPM scaling factor would be a floating-point decimal value from 0.00 up to 2.00, including all interim values. Let's say the user leaves the RPM scaling factor in the graphical interface 900 at 1.00. In that case, the final scaled RPM range would be 20-120, or zero if the simulated car's engine was off or disabled. If the user set the graphical RPM scaling value to 1.50, the final scaled RPM range would be 20 times 1.5, or 30, up to 120 times 1.5, or 180, giving a final range of 30 to 180. In this way, by adjusting a simple control, the original unadulterated raw RPM value as generated by the simulation is converted to a useful and preferred strength. A similar process is used for all the telemetry variables, such that the relative strength of each can be tweaked to produce useful results. However, all the final results descend directly from the raw telemetry as calculated by the original software application 104 as mapped into the application generated telemetry 600 shared memory area. More detail will be examined later in this disclosure.

Continuing with FIG. 2, in step 708, we determine the baseline feedback level from the fundamental telemetry variables engine RPM, vehicle MPH, and throttle position. These are non-directionally scaled forces, which is why they together comprise what is known as the "baseline" tactile feedback level. In much the same process as above, the final scaled engine RPM value is calculated. With regard to MPH, lets assume in one game the given car has a speed range of 0 to 130 MPH, and in another game or simulation, the car has a speed range of 0 to 236 MPH. In the case where the top speed is 130 MPH, a constant scaling factor would be the current speed always divided by 1.3 (or rather multiplied by 0.769) such that the speed range was reduced to 0 to 100. Likewise, in the case where the car's top speed was 236 MPH, the constant scaling factor would be the current speed divided by 2.36 (or rather multiplied by 0.424), thereby yielding the same range 0 to 100. This makes the scaled MPH range consistent from game to game and simulation to simulation. Then, in the graphical interface 900 within the telemetry processor 700 application, a MPH scaling factor is provided where the user can increase or decrease the importance of the MPH by adjusting a multiplier with a graphical scroll bar, where the scaled MPH range now from 0 to 100 would be multiplied by any selected number 0.00 to 2.00, in the same way was the RPM was previously.

The next step is to compare the final RPM result and MPH result, and to accept the highest value as the baseline tactile feedback value for that cycle through the telemetry processor 700, which typically runs at hundreds of cycles second. This way, if you are going 0 MPH but your simulated engine has produced a final RPM vibration value of 88, you'll feel tactile feedback at a "strength" of 88. Again, this is illustrative only. Likewise, if you are traveling at a velocity of 150 MPH, and your MPH scaling factor is 0.70, but you've just blown your engine up and are at 0 (zero) engine RPM, you'll still feel 150 MPH times 0.70, for a vibration "strength" of 105. In this way, RPM and MPH are constantly fighting each other depending on which is the higher value at each and every single pass through the code in the telemetry processor 700 (which may be running at several hundred cycles per second).

Now the telemetry processor factors in the throttle position, because RPM or MPH should both feel stronger if you are full on the throttle, or not on the throttle at all. For example, if your throttle position runs from 0.00 at no throttle to 1.00 at full throttle, we may set a first scaling factor of "plus 0.60", that is, adding 0.60 to each end of the throttle range, which changes the throttle scaling factor from 0.00-1.00 to 0.60-1.60. Now, the graphical scaling factor is utilized to change that range yet again according to the user's preference. If the user sets the graphical scaling factor for the throttle to 0.82, the final throttle scaling factor becomes 0.82 times 0.60 (or 0.492) at the low end. and 0.82 times 1.60 (or 1.312) at the high end, so the final range is 0.492 to 1.312, depending on the position of the throttle.

From this very simple basis, the raw telemetry calculated by the software application 104 has produced tactile feedback that is indicative of the engine RPM, vehicle MPH, and driver's throttle position. This is the "baseline" tactile feedback. Were the application generated telemetry 600 not provided, the AudioSense® audio analysis mode of operation of the universal tactile feedback controller 200 would have provided this baseline tactile feedback level. The importance of this cannot be stressed enough, because directional scaling is completely worthless if it is not based on an effective "baseline".

Continuing on to step 710, the baseline tactile feedback values are now scaled according to the lateral gforce, acceleration, and deceleration telemetry. The unique nature of the preferred embodiment is that the tactile feedback seat in the parent cases has multiple zones, that is, a back zone, a left leg zone, and a right leg zone. Much like stereo speakers can create the illusion of a sound originating from any point between only two speakers by biasing the amplitude of the broadcast sound toward one speaker, and reducing it at the other, the tactile feedback seat functions in much the same way. If we are in a left turn, simple math is applied to increase the tactile feedback felt in the right leg zone, and to decrease the tactile feedback in the left leg zone. For example, if the lateral g-force is 2.3 g's, the tactile feedback for the right leg is be multiplied by 2.3, while the left leg is divided by 2.3. The scaling factors would change the numerical range of the G's to bring them into a useful range. In this way, the driver of the simulated car feels tactile cues that indicate he or she is being thrown to the outside of the turn, in direct proportion to the lateral g-forces involved. Likewise, upon acceleration, tactile feedback in the back zone is increased (i.e., multiplied by the scaled telemetry acceleration value) while tactile feedback in the legs is simultaneously reduced (i.e., divided by the scaled telemetry acceleration value), such that the illusion is provided that the driver is being thrown backward into the seat. Likewise, on deceleration, tactile feedback is increased at the legs and simultaneously reduced at the back, such that the illusion is provided that the driver is being thrown forward in the seat, as previously in direct proportion to the g-force values involved. The first layer of scaling factors work in the same way to bring the raw telemetry into a useful range, while the graphical interface is used to set the user's preference as to how strong this directional scaling is to be perceived. By changing any given scaling factor, the math that is applied to the raw scaled data is change accordingly. In this way it is very easy to dial in excellent tactile feedback, because all the calculations are based on the mathematics that are already built into the simulation due to the nature of the shared telemetry.

Continuing on to step 712, tactile feedback texturing is applied to the now directionally scaled tactile feedback values. Texturing adds choppiness and other characteristics to the tactile feedback. For example, if a "damage flag" indicates that there is a flat tire on the left side of the car, there may be a "flat tire scaling factor" provided in the graphical user interface 900 within the telemetry processor 700 that sets the flat tire scaling factor as 1.5 times (1.5×). The texturing to the left leg zone in the tactile feedback seat (the side of the vehicle with the simulated flat tire) would now be periodically multiplied by 1.5× in some time period that is directly proportional to the current MPH of the car. Again, very simple math is used to create dramatic effects, all directly descending from the raw telemetry and the same general-purpose algorithms in place for most games or simulation of the car type genre. In other tactile feedback technologies, the effects for flat tires are canned periodic cycles of bumping that has no correspondence with the speed of the given vehicle because there is no telemetry shared between the application and the tactile feedback algorithms.

In the case of the car's current gear (the vehicle's transmission) telemetry data element, simple math can yield a brief skip in the tactile feedback throughout the tactile feedback seat any time the gear changes. For example, if the gear has just changed from 2 to 3, the telemetry processor may have two factors associated with gear changes, that is, a percent reduction value, and a time value in milliseconds. If the gear change scaling factors indicate that the tactile feedback throughout the seat should be multiplied by 0.25 and that condition should last for 100 milliseconds every time a gear changes, then each gear change will cause a direct self-generating effect of a 75% reduction in perceived tactile feedback for 0.10 seconds at every gear change. For the brake pedal position telemetry data, hard braking at fast speeds can make other very brief scaling factors take effect. Surface type can layer additional scaling factors upon the baseline vibration. The end result is that the telemetry data itself carries the information about what is happening, and all perceived tactile feedback descend directly from the actual state of the simulation or game.

In step 714, we transmit the current tactile feedback results to the universal tactile feedback controller 200 with the standard intelliVIBE® protocol, but no limitation should be inferred about which types of tactile feedback devices can benefit from this telemetry based approach.

Figure 3:
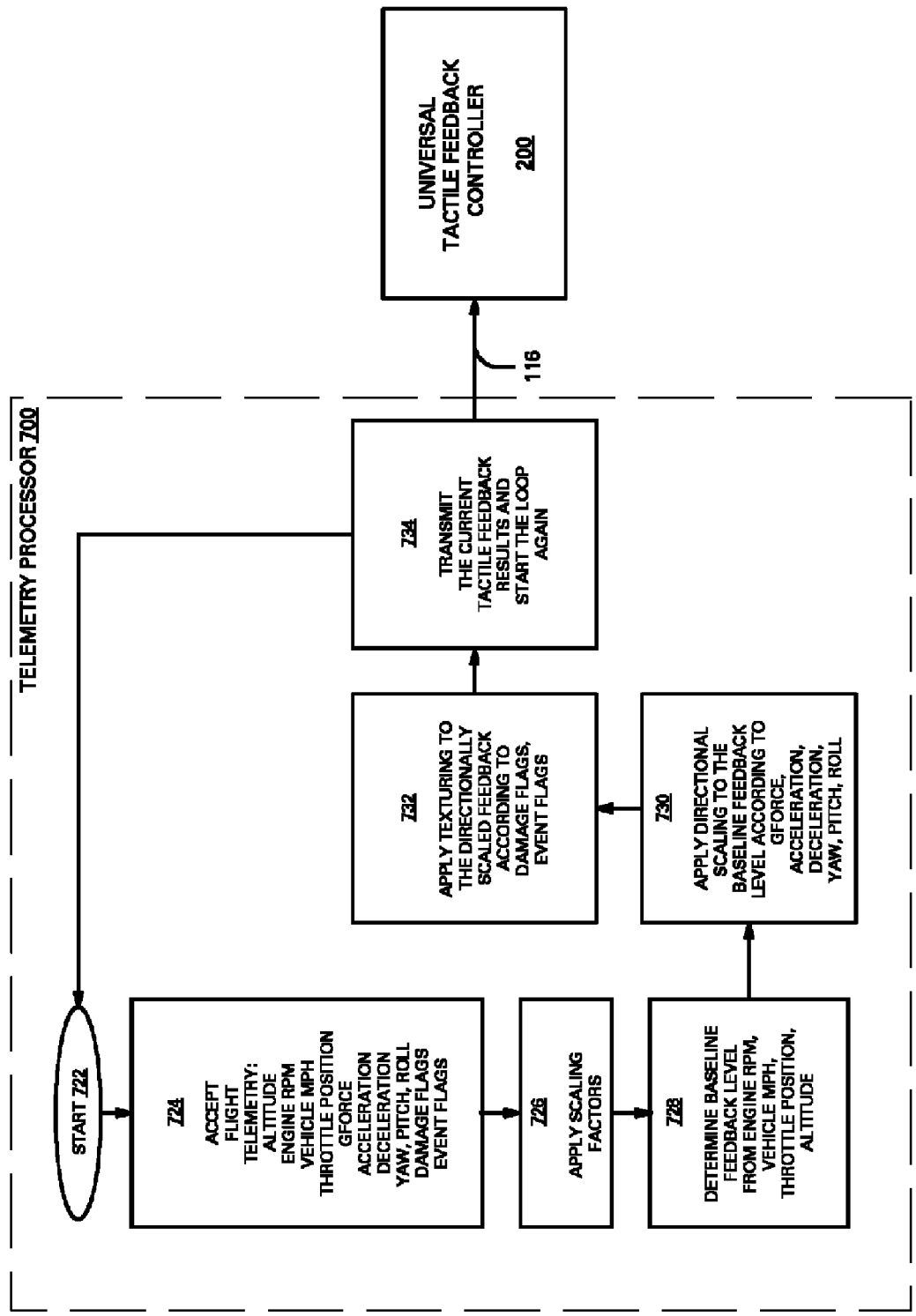
FIG. 3 is a flow chart for using illustrative application generated telemetry to generate tactile feedback for a flight simulation.

Continuing on to FIG. 3, it is nearly identical to FIG. 2, but the telemetry carries data relevant to flight simulations instead of car simulations. Steps 722, 724, 726, 728 are analogous to steps 702, 704, 706, 708 of FIG. 2. However, for step 730, we refer now to FIG. 6.

The major difference here is the way the telemetry processor handles g-forces, pitch, and roll, which are data typical of flight simulations. The innovative approach here allows two possibilities for rendering aircraft rolls, that is, when an aircraft such as a modern military jet rolls on its center axis in a continuous right or left turn. In reality, when a jet enters a continuous roll to the right, the passengers get pushed to the left side and stay there due to the g-forces involved that are stable for the duration of the rightward roll. This is calculated just like the lateral g-forces of the car of FIG. 2. However, an aircraft's roll can be divided into four quadrants, each of which affects the rendering of the roll in a different way.

Rather than a continuous push to one side, which is a realistic and readily available but perhaps a dull representation, we can artificially induce additional aircraft orientation data in the tactile feedback that is produced.

Figure 6:
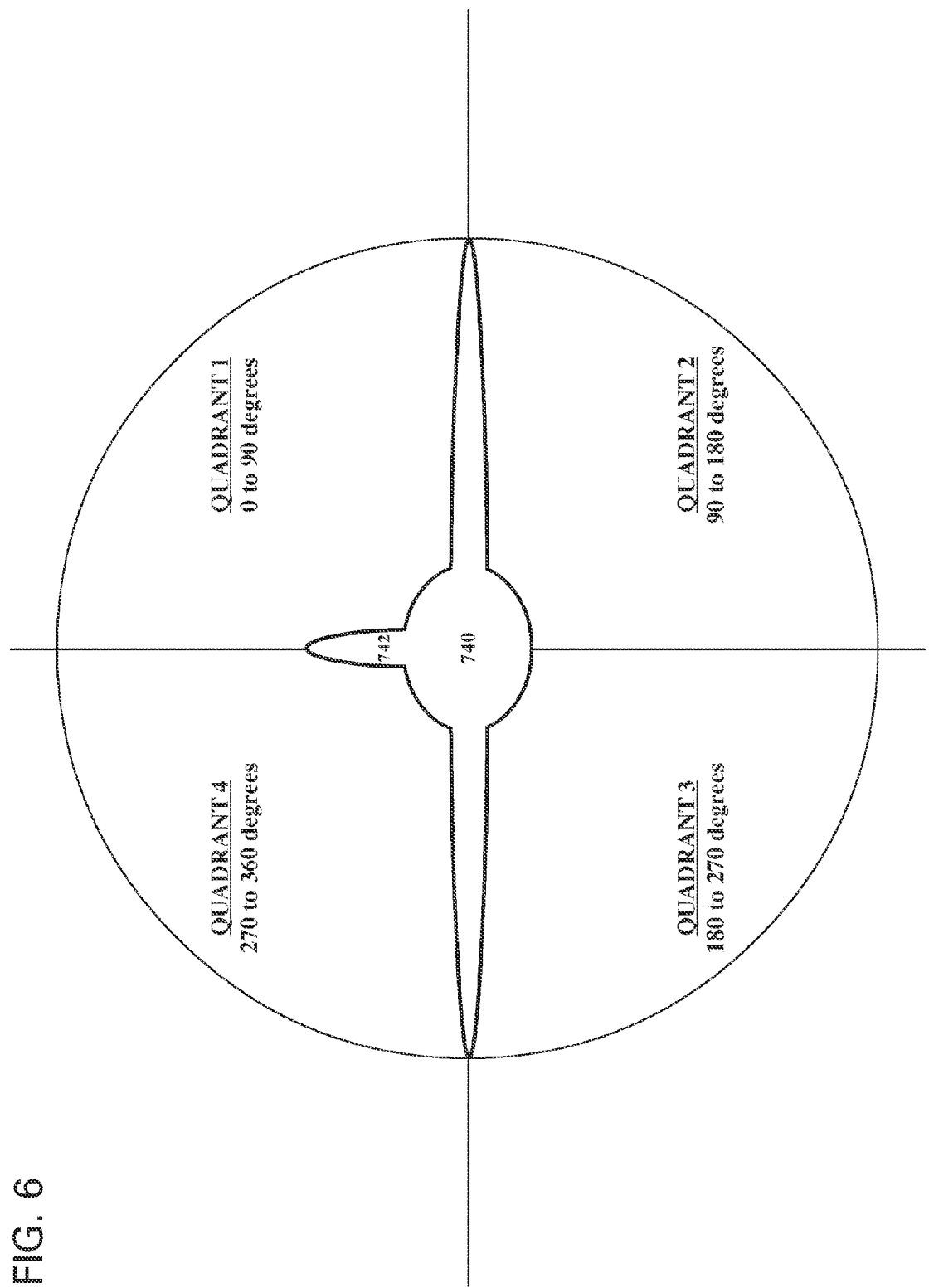
FIG. 6 depicts an aircraft and the 4 quadrants used as the basis for an innovative aircraft roll algorithm.

Referring now to FIG. 6, an aircraft 740 is depicted with its tail 742 pointing straight up, that is, the aircraft is perfectly level. The current quadrant is determined by the orientation of the aircraft's tail 742. Whichever quadrant 1, 2, 3 or 4 the aircraft's tail 742 points to, that is the quadrant the aircraft is considered to be in for the purposes of rendering the "roll" effect upon the baseline vibration. Referring now to FIG. 7, the quadrants 1, 2, 3 and 4 are analogous to the same quadrants of FIG. 6. However, FIG. 7 explains the simple algorithm by which the right leg tactile feedback value and the left leg tactile feedback value are scaled depending in which quadrant the aircraft's tail is oriented. With this simple math applied to the telemetry derived "baseline" vibration values, the user gets a excellent feel of the aircraft's orientation while interacting with any given aircraft simulation or game. With the innovative algorithm of FIG. 7, a continual roll to the right in the aircraft does not produce a static leftward bias as would be the case if driving a car, but rather, the left-right leg bias actually rolls around the seat in direct proportion to the simulated aircraft's orientation. When fully inverted, that is, upside-down, the bias disappears and the legs tactile feedback scaling is nullified. This is a completely artificial effect, having no basis in reality; however, the effect is remarkable and highly effective.

When in any vehicle, positive and negative g-forces are experienced. Some vehicles induce more positive and negative g-forces than others, but nonetheless, because of the telemetry offered by a given simulation or game, the same mathematics apply and are effective across the board. When experiencing positive g-forces, one gets the feeling of weighing more than they actually weigh, in direct proportion to the positive g-forces that are experienced. Therefore, with the telemetry based system, positive g-forces are mathematically multiplied against the leg section (both left and right legs), thereby making the user feel "heavier", while simultaneously used as a divisor to mathematically reduce the tactile feedback to the back zone. Most often the raw g-forces are scaled into the range of 1.000 to 2.000. Of course, as with all scaling factors, the users have additional scaling factors to augment of reduce the prevalence of the g-forces. Likewise, when experiencing negative g-forces, one gets the feeling of being more weightless than is normal. Therefore, when negative g-forces are present, the negative g-force value is multiplied by the back value to increase the back zone tactile feedback, while simultaneously used as a divisor to mathematically reduce the tactile feedback to the legs, making one feel like they are rising out of the tactile feedback seat.

When the roll of an aircraft is simultaneously layered with the positive and negative g-forces, one gets to experience a very tactile and informative representation of the aircraft's flight envelope. Similarly, pitch and yaw, and any and all other telemetry, can be layered into the calculations as well. The forces so calculated are not arbitrary, yet are based upon the actual math occurring in real time in the shared telemetry memory area. The only subjective element to all these forces are the user's adjustment of the graphical scaling factors in order to make any particular effect more or less prevalent in comparison to all the other forces for which telemetry data is available.

Figure 4:
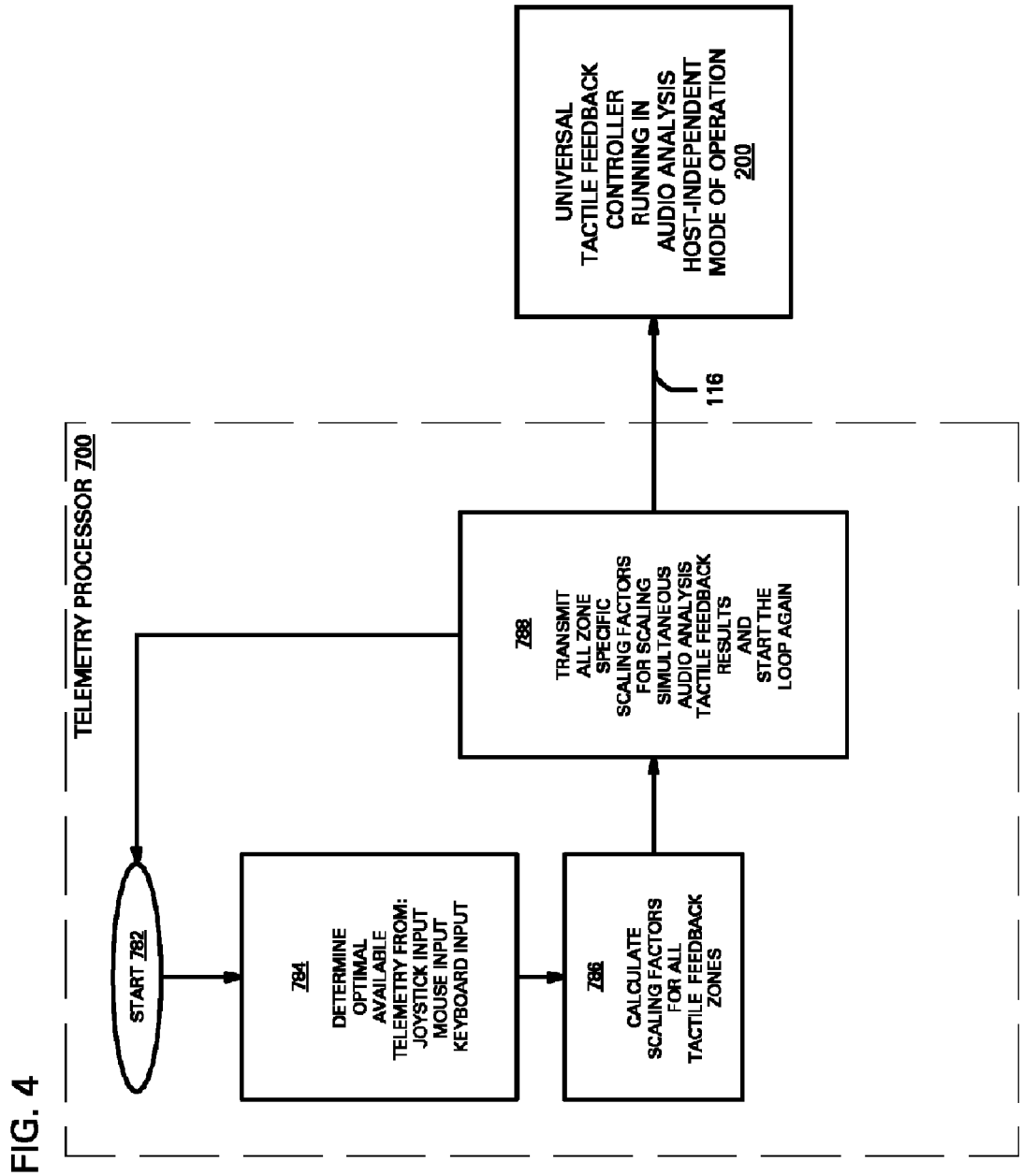
FIG. 4 is a flow chart for using illustrative self-generated telemetry to generate scaling factors for directionally scaling tactile feedback simultaneously produced via audio analysis.

Referring now to FIG. 4, the telemetry processor 700 does not have the benefit of application-generated telemetry. Therefore, the universal tactile feedback controller 200 will run in its audio analysis mode of operation (AudioSense®). When in AudioSense®, the baseline tactile feedback~s produced without capabilities for directional biasing, regardless as to the forces acting on the user's vehicle or person in any particular application. Simply put, the tactile feedback system has no awareness as to the specific calculations that are necessarily taking place in any particular application. When this is the case, the telemetry processor begins in step 782 and in step 784 examines the telemetry it can derive from the host computer's 102 control input devices. If, for example, the user of a non-telemetry supportive title (I.e., no intelliVIBE® support) is running in AudioSense®, they can give specific scaling instructions to the telemetry processor 700 so that it can generate real time tactile feedback zone-specific scaling factors that will introduce real time scaling upon the AudioSense® audio analysis results. For example, if the user is playing a car racing simulation that offers no intelliVIBE® support, the telemetry processor can track the movement of the player's joystick and can know its deflection from center on both the X and Y axes, that is, left and right (steering) and forward and back (acceleration and brake) of the simulated vehicle. Certainly this is not as good as real time telemetry, but the telemetry processor 700 will do the best it can with what data it can find. In this case, the user will adjust the joystick scaling factors such that the longer the accelerator axis (presumably the Y axis, but configured as such by the user) is pressed forward, the more speed the telemetry processor will assume will have been gained by the simulated vehicle. As the simulated vehicle is assumed to be going faster, it will automatically adjust the X-axis scaling factors (the car's steering) to make the lateral g-forces more prevalent. Likewise, if the Y axis indicates that the user has stepped on the brake of the simulated vehicle, the telemetry processor will indicate this in the stream of scaling factors that are being broadcast to the universal tactile feedback controller 200 such that a deceleration effect is produced by directionally biasing the tactile feedback in the seat to the legs section of the tactile feedback seating unit, and away from the back section.

The scaling factors are calculated in real time based upon assumed data, so they do not have the finesse of real-time accurate telemetry that would ideally be available. The scaling factors are 8 bit values, (0-255), wherein whatever value given as a scaling factor is divided by 32 within the universal tactile feedback controller 200. The scaling factors exist in a data table, where each single scaling factor is applied to only one of eight zones: back, left leg, right leg, chest, left hand, right hand, left foot, right foot. These zones are illustrative and not assumed to match this presently preferred embodiment. Sending a scaling factor of 32 yields no change to a particular tactile feedback zone because of the subsequent divide by 32 that occurs within the universal tactile feedback controller 200 (i.e., 32 divided by 32 equals 1.0). However, a scaling factor of 16 sent to the left leg will cut the tactile feedback there in half, because 16/32 yields a scaling factor of 0.5×. The divide by 32 algorithm is used to yield very fast mathematical performance by using a shortcut rather than full floating point math which would impede the performance of AudioSense® if the microcontroller inside the universal tactile feedback controller 200 does not offer full hardware multiply and divide.

By monitoring the joystick input over time, fairly accurate assumptions can be made about a particular game or simulation, but this requires more complicated help by way of predetermined application-specific telemetry processor 700 configuration files. For example, in the real F16 Falcon military aircraft, the main cannon only has capacity enough for approximately 2.3 seconds of trigger time before it runs out of 30 mm cannon shells. Therefore, the telemetry processor 700 for an accurate F 16 simulation with limited ammunition can assume from its configuration data that the main joystick trigger (or some corresponding keyboard key) fires the main cannon. Without proper telemetry being given, the telemetry processor will keep track of the time the cannon trigger is active. During the presumed activation of the cannon, an effect will be rendered according to the scaling parameters in effect for the cannon. After approximately 2.3 seconds of trigger time, the intelliVIBE® cannon effect will be disabled until reset by the user. However, AudioSense® will still do its best to render the cannon by interpreting the sound of it firing if the cannon is not yet depleted of ammunition. Additionally, if the throttle has been active and at a high power, and the joystick has tended to be pulled back, the telemetry processor can assume that the aircraft is airborne, and can then do its best to use the joystick position to send scaling factors to the left leg, right leg, and back zones of the tactile feedback seat in order to simulate the G-forces and bank roll effects that would ideally be more accurately prompted by fully supported telemetry. Even with the slightly less than-ideal implementation of AudioSense® audio analysis and assumed game state data by way of brute force self-generated telemetry via game-specific control input analysis, the combination of cooperative AudioSense® with intelliVIBE® scaling is a very effective means of self-generating very appropriate tactile feedback, regardless of the lack of support by any given application.

Figure 5:
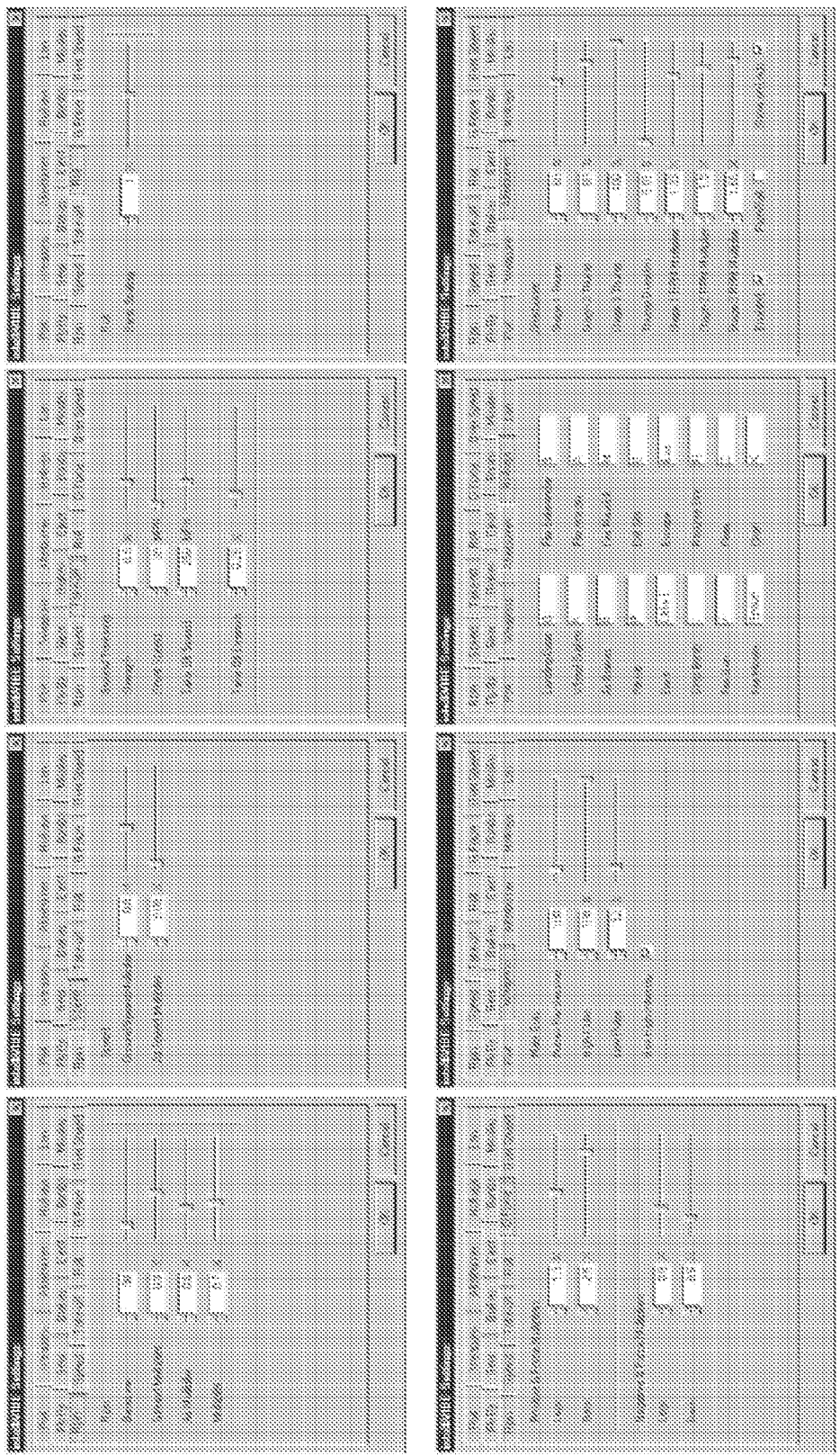
FIG. 5 shows an illustrative group of graphical controls for adjusting various telemetry scaling factors.

Referring now to FIG. 5, a group of user adjustable telemetry scaling factors is presented. These controls are illustrative only for the purposes of understanding. Getting a closer look at FIG. 5A, the RPM baseline tactile feedback generator is presented. The baseline setting of 30 establishes the basic level of prevalence of engine RPM induced tactile feedback. The multiplier at the bottom shows 0.7, which is used to scale the 30 baseline setting. If the aircraft is known to be on the ground, the engine RPM setting is multiplied by 0.9, whereas if the aircraft is in the air, the engine RPM is multiplied by 0.6, thereby making the engine RPM feel weaker once in the air.

Figure 5B:
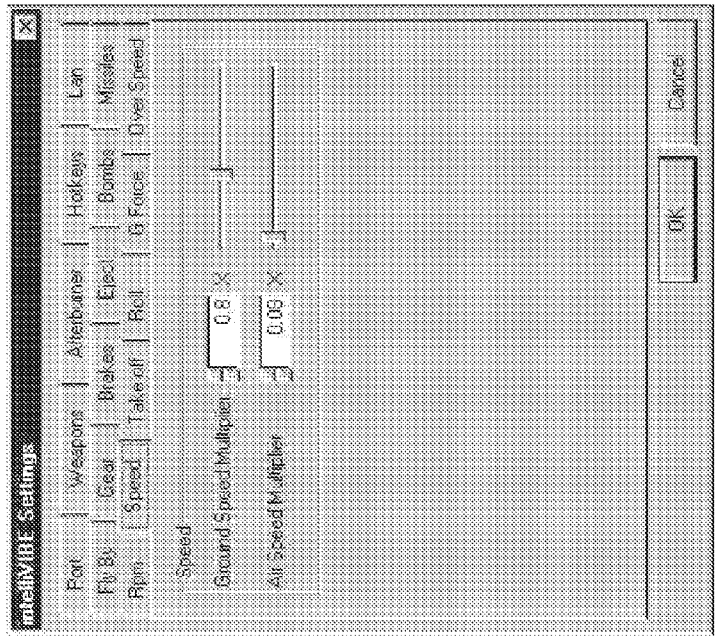
FIG. 5B depicts the graphical controls of FIG. 5, specifically illustrative SPEED telemetry scaling factors.
Figure 5A:
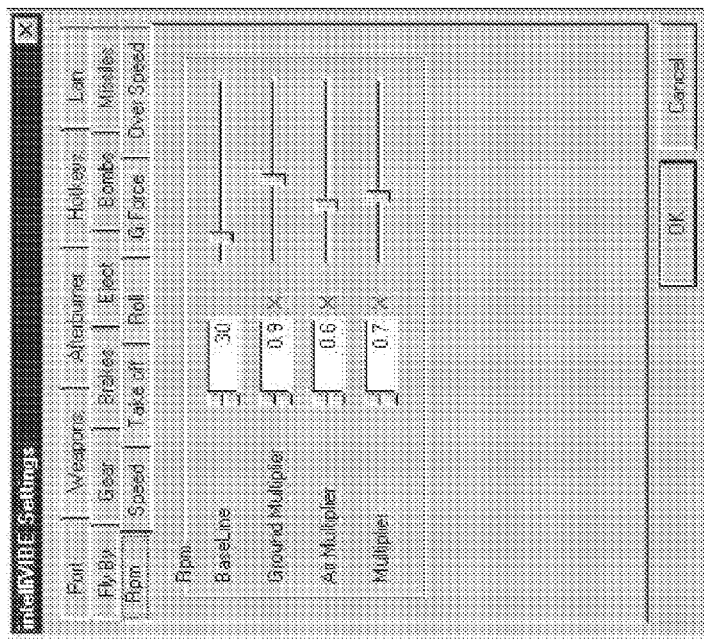
FIG. 5A depicts the graphical controls of FIG. 5, specifically illustrative RPM telemetry scaling factors.

Referring now to FIG. 5B, the speed value is multiplied by 0.8 if the aircraft is on the ground, while it is multiplied by 0.08 if the aircraft is in the air. This has the effect of making the speed tactile effect ten times weaker when the aircraft is airborne, but the typical maximum speed when on the ground might be only 180 MPH, but when airborne, a modern military aircraft can travel at 1,300 MPH and higher. These scaling factors allow the tactile feedback to be matched to a useful range regardless as to the performance envelope of any particular aircraft, simply by adjusting the slider knob of the corresponding scaling factor control.

Figure 5D:
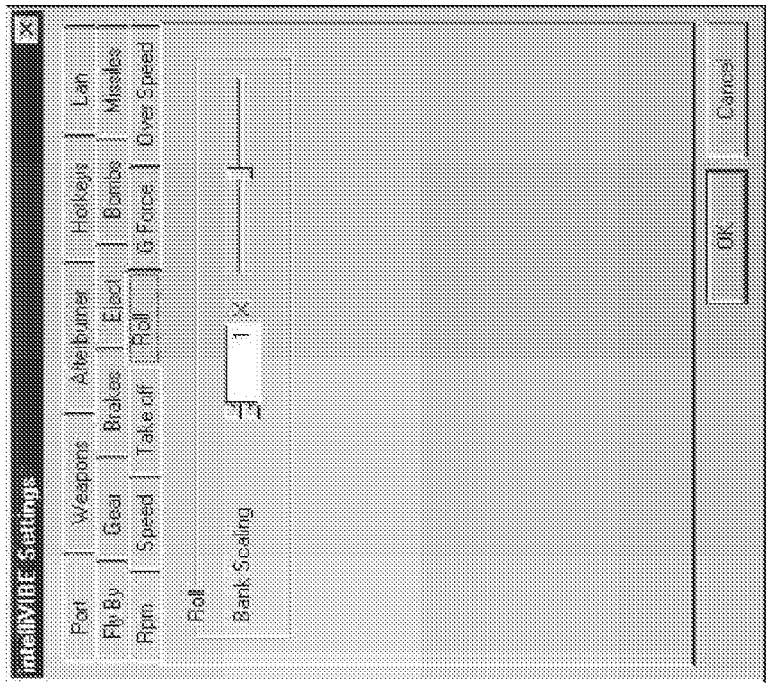
FIG. 5D depicts the graphical controls of FIG. 5, specifically illustrative ROLL telemetry scaling factors.
Figure 5C:
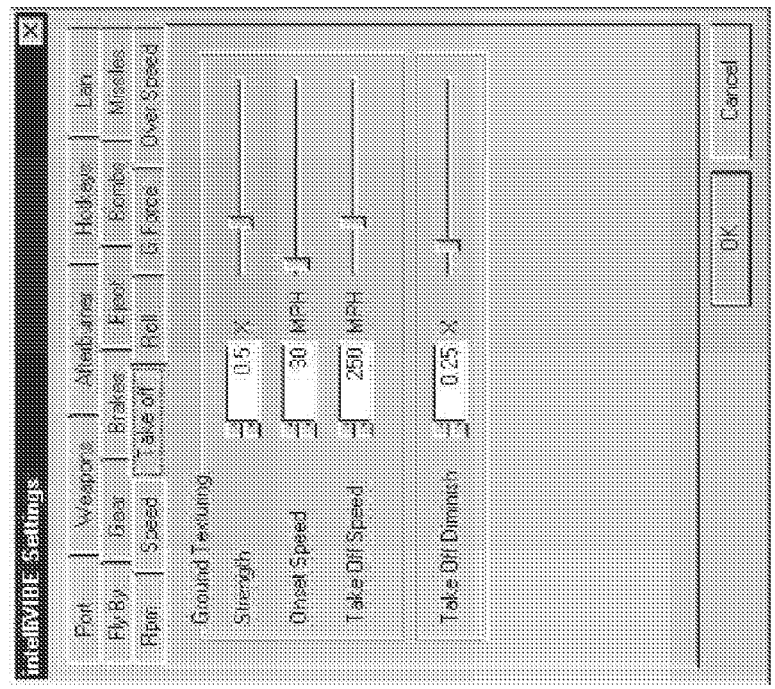
FIG. 5C depicts the graphical controls of FIG. 5, specifically illustrative TAKE OFF telemetry scaling factors.

Looking now at FIG. 5C, we have a compound effect called ground texturing. Ground texturing is set to begin at 30 MPH and end at 250 MPH, which is well past a conservative take-off speed. Ultimately as the aircraft goes faster, the ground will create more and more texturing, that is, bumpiness in the tactile feedback. Upon takeoff, the ground texturing will be reduced to 25% (multiplied by 0.25×) until the take off speed is surpassed, which then nullifies the ground texturing, until the aircraft comes in for a landing, at which time the ground texturing will automatically take effect yet again.

FIG. 5D presents the bank scaling value. The 1.0 as shown lets the bank scaling take place just as the calculations in FIG. 7 indicate. However, if the user wants the bank scaling to be stronger, they only need to increase the corresponding 1.0 scale factor setting. To reduce bank scaling, setting bank scaling to toward 0 will nullity the effect accordingly.

Figure 5F:
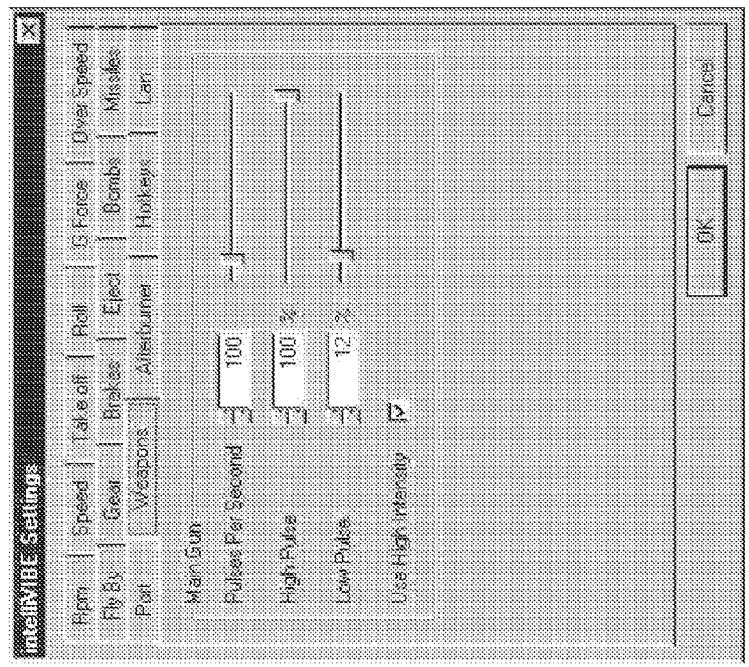
FIG. 5F depicts the graphical controls of FIG. 5, specifically illustrative WEAPONS telemetry scaling factors.
Figure 5E:
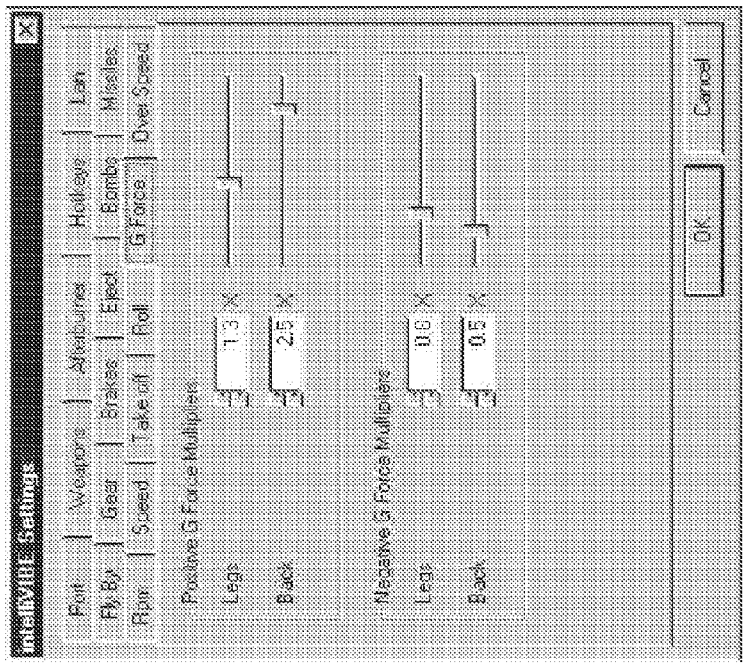
FIG. 5E depicts the graphical controls of FIG. 5, specifically illustrative G-FORCE telemetry scaling factors.

FIG. 5E presents the positive and negative G-force multipliers. In positive g-force conditions, these settings multiply the legs by 1.3 times the g-force value, and multiply the back by 2.5 times the g_force value. In negative G-force conditions, the back is reduced by half and the legs are scaled to 80% for the duration of the negative G-force condition.

In FIG. 5F, the scaling factors for the main gun are available. During the firing of the main gun, 100 pulses per second will occur in the tactile feedback, alternating between a high pulse percentage of 100% and a low pulse percentage of 12% as determined by the scaling factors. The "use high intensity" check box allows the main gun to temporarily over-ride the current intensity setting for the duration of the main gun being fired. Knowing that the main gun is being fired can be given to us by application generated telemetry 600 or self-generated telemetry 800, same as with all the effects and scaling factors of FIG. 5A through FIG. 5H.

Figures 5G, 5H:
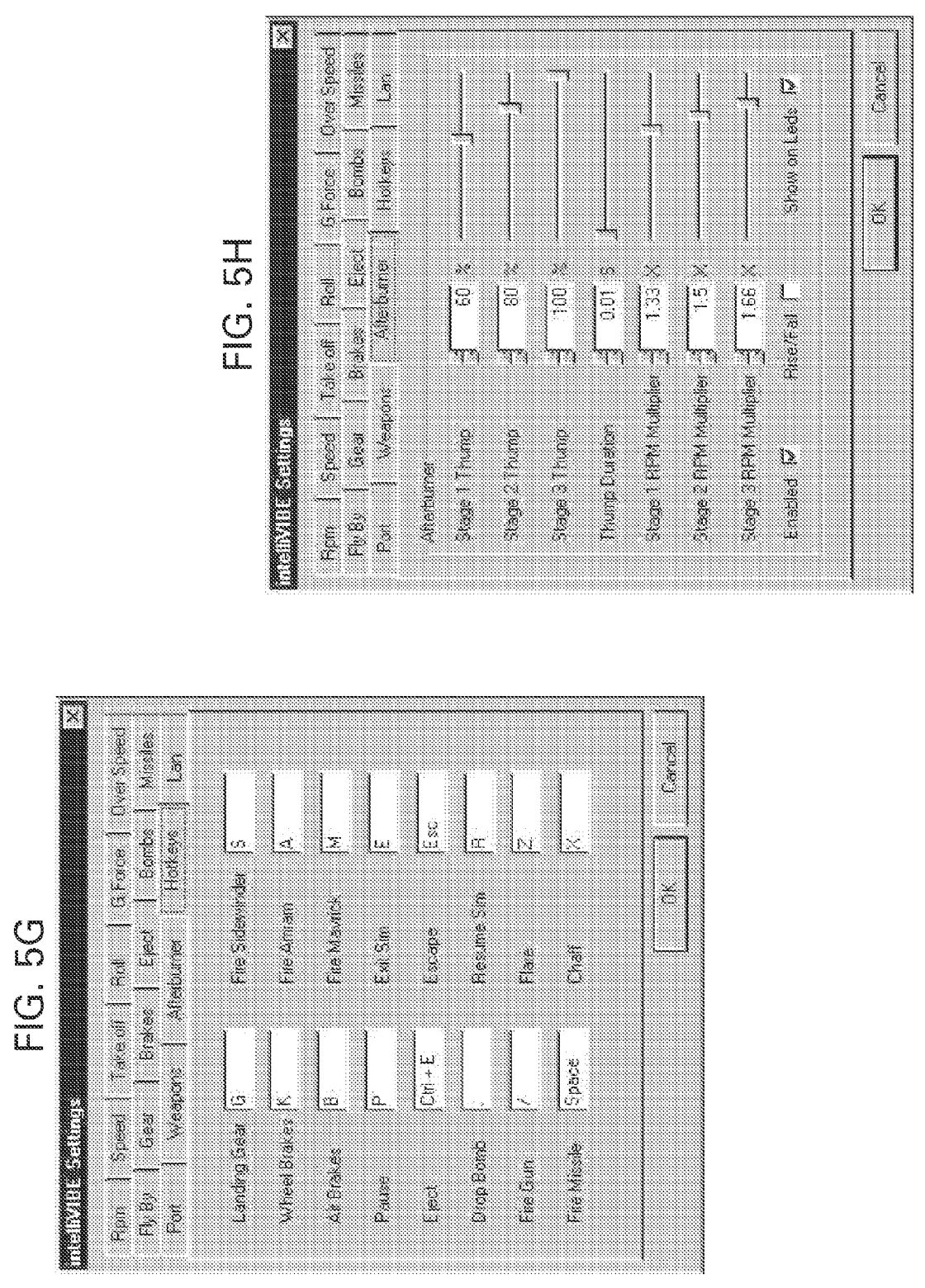

In FIG. 5G, the telemetry processor 700 is told what key press equals what known effect. This is configured by the user. For example, we can see in the upper left corner that the "G" key activates the landing gear. This way, if the user presses the G key to deploy the landing gear, the telemetry processor can run a simple effect representing the landing gear. If telemetry is not provided that indicates the true state of the landing gear, the telemetry processor 700 will fall back on its self-generating capability and keep track of the G key presses on its own and will do its best to stay in sync with the simulation in question.

In FIG. 5H, an illustrative afterburner effect is shown. Many modern jets have multiple stages of afterburner. In FIG. 5H, there are 3 stages of afterburner, where stages one, two, and three yield tactile "thumps" at 60%, 80%, and 100% strength, respectively, each lasting only 0.0 I seconds, but also incorporating an RPM scaling factor of 1.33×, I.5×, or 1.66× times respectively, which will increase the prevalence of the engine RPM according to what level of afterburner the aircraft is in, for as long as the afterburner is active.

Ultimately, the innovative methods and apparatus of the present invention allows for the most versatile tactile feedback results to be produced, both with and without support of any kind by the host computer 102 and the executing software application 104. The best condition is for fully detailed low-burden telemetry to be provided for the benefit of the universal tactile feedback controller 200 by a given developer. However, in the absence of given telemetry via a shared data structure by standard windows memory mapping, the telemetry processor 700 of the present invention is able to generate data on its own to supplement the AudioSense® audio analysis mode of operation with real time directional biasing of all tactile feedback, in the end producing effective zero-burden feedback from the point of the game developer . . . in the end eliminating the fundamental problem of lack of quality developer support.

Although various embodiments which incorporate the teachings of the present invention have been shown and described in detail herein, those skilled in the art can readily devise many other varied embodiments that still incorporate these teachings. Accordingly, the described embodiments are to be considered in all respects only as illustrative and not restrictive. Therefore, it is to be understood that nothing shall be construed as a limitation of the present invention, other than the structure recited in the appended claims.

What is claimed is:

1. Apparatus for providing, in response to signals generated by a computer or video game system, tactile sensation to a user of said computer or video game system, said apparatus comprising:
    a hand-held game pad controller;
    where said hand-held game pad controller is adapted to be held by both of a user's hands simultaneously;
    two motors disposed within said hand-held game pad controller, for selectively generating tactile sensation as vibrations;
    control circuitry, coupled to said two motors, where said control circuitry is responsive to signals that are generated by said computer or video game system;
    where said signals correspond to action executing on said computer or video game system;
    where said control circuitry controls said two motors, where said two motors are controllable independently of each other;
    where said two independently controllable motors each has a mass attached to its shaft such that when each motor is activated, its shaft rotates, such that said two motors each generate vibrations via the rotation of each said attached mass on each said shaft;
    where the speed of rotation of each rotating shaft of each of said two motors is independently changeable in real time;
    where said vibrations generated via the rotation of each said attached mass change in real time in accordance with said independently changing speed of rotation of said rotating shafts of said two motors;
    where said two motors generate vibrations simultaneously, wherein the simultaneous vibrations are of independent intensities with respect to each other;
    where said vibrations of said simultaneous independent intensities combine in said hand-held game pad controller into a simultaneous combination of vibrations;
    where said simultaneous combination of vibrations is felt in both hands of the user holding the hand-held game pad controller.

2. The apparatus of claim 1, where said signals that are generated by said computer or video game system to which said control circuitry is responsive, are communicated via one or more of the following: (1) bi-directional communications; (2) uni-directional communications; (3) wireless communications; (4) wired communications.

3. The apparatus of claim 1, where each motor of the said two motors can be different from each other, in at least one of the following ways: (1) size; (2) shape; (3) power consumption; (4) type; (5) the tactile sensations each can produce when controlled; (6) the desired effect each is adapted produce when controlled; (7) the desired application; (8) the location wherein said actuators are disposed within said control input device; (9) the manner by which said actuators are disposed within said control input device.

4. The apparatus of claim 1, where a first motor of said two motors is disposed within a left hand side of said hand-held game controller and predominantly provides tactile sensation to said user's left hand, and where a second motor of said two motors is disposed within a right hand side of hand-held game controller and predominantly provides tactile sensation to said user's right hand.

5. The apparatus of claim 1, wherein each of said two motors may be independently activated, without respect to the independent activation of the other of said motors, in one or more of the of the following ways: (1) activating for varying durations; (2) activating at varying speeds; (3) activating at varying intensities; (4) activating at varying duty cycles; (5) activating with varying power output parameters; (6) activating via pulse-width modulation; (7) activating with varying electric current; (8) activating with varying electric voltage.

6. The apparatus of claim 1, wherein each of said two motors is disposed within said hand-held game pad controller by any one or more of the following: (1) attachment to an interior surface of said hand-held game pad controller with one or more fasteners; (2) attachment to an interior surface of said hand-held game pad controller with an adhesive; or (3) placement within said hand-held game pad controller by press fitting, snap fitting, or friction fitting.

7. Apparatus for providing, in response to signals generated by a computer or video game system, tactile sensation to a user of said computer or video game system, said apparatus comprising:
    a hand-held game pad controller;
    where said hand-held game pad controller is adapted to be held by both of a user's hands simultaneously;
    a plurality of motors disposed within said hand-held game pad controller, for selectively generating tactile sensation as vibrations;
    where at least one of said plurality of motors is disposed within a left hand side of said hand-held game controller and predominantly provides tactile sensation to said user's left hand, and at least a second motor of said plurality of motors is disposed within a right hand side of said hand-held game controller and predominantly provides tactile sensation to said user's right hand;
    control circuitry, coupled to said plurality of motors, where said control circuitry is responsive to signals that are generated by said computer or video game system;
    where said signals correspond to action executing on said computer or video game system;
    where said control circuitry controls said plurality of motors, where at least two motors of said plurality of motors are controllable independently of each other;
    where said at least two independently controllable motors each has a mass attached to its shaft such that when each motor is activated, its shaft rotates, such that said motors each generate vibrations via the rotation of each said attached mass on each said shaft;
    where the speed of rotation of each rotating shaft of each of said at least two motors is independently changeable in real time;
    where said vibrations generated via the rotation of each said attached mass change in real time in accordance with said independently changing speed of rotation of said rotating shafts of said at least two motors;
    where said at least two motors generate vibrations simultaneously, wherein the simultaneous vibrations are of independent intensities with respect to each other;
    where said vibrations of said simultaneous independent intensities combine in said hand-held game pad controller into a simultaneous combination of vibrations;
    where said simultaneous combination of vibrations is felt in both hands of the user holding the hand-held game pad controller.

8. The apparatus of claim 7, where said signals that are generated by said computer or video game system to which said control circuitry is responsive, are communicated via one or more of the following: (1) bi-directional communications; (2) uni-directional communications; (3) wireless communications; (4) wired communications.

9. The apparatus of claim 7, where each motor of the said plurality of motors can be different from each other, in at least one of the following ways: (1) size; (2) shape; (3) power consumption; (4) type; (5) the tactile sensations each can produce when controlled; (6) the desired effect each is adapted produce when controlled; (7) the desired application; (8) the location wherein said actuators are disposed within said control input device; (9) the manner by which said actuators are disposed within said control input device.

10. The apparatus of claim 7, wherein each of said plurality of actuators may be independently activated, without respect to the independent activation of the other of said actuators, in one or more of the of the following ways: (1) activating for varying durations; (2) activating at varying speeds; (3) activating at varying intensities; (4) activating at varying duty cycles; (5) activating with varying power output parameters; (6) activating via pulse-width modulation; (7) activating with varying electric current; (8) activating with varying electric voltage.

11. The apparatus of claim 7, wherein each of said plurality of motors is disposed within said hand-held game pad controller by any one or more of the following: (1) attachment to an interior surface of said control input device with one or more fasteners; (2) attachment to an interior surface of said control input device with an adhesive; or (3) placement within said control input device by press fitting, snap fitting, or friction fitting.

12. The apparatus of claim 7, where said signals that are generated by said computer or video game system to which said control circuitry is responsive, are generated by software that is executing on said computer or video game system, where said software has been designed to communicate with said control circuitry, where said software is a computer simulation or video game executing on said computer or video game system, where said computer simulation or video game is adapted to create said simultaneous combination of vibrations by independently controlling said at least two independently controllable motors, such that said combination of vibrations to be felt in said both hands of said user holding said hand-held game pad controller corresponds to action executing in real time in said computer simulation or video game.

13. A system for providing tactile sensation to a user of a video game, said system comprising:
a video game console;
a hand-held game pad controller;
where said hand-held game pad controller is adapted to be held by both of a user's hands simultaneously;
a plurality of motors disposed within said hand-held game pad controller, for selectively generating tactile sensation as vibrations;
control circuitry, coupled to said plurality of motors, where said control circuitry is responsive to signals that are generated by said video game system;
where said signals correspond to action executing on said video game system;
where said control circuitry controls said plurality of motors, where at least two motors of said plurality of motors are controllable independently of each other;
where said at least two independently controllable motors each has a mass attached to its shaft such that when each motor is activated, its shaft rotates, such that said motors each generate vibrations via the rotation of each said attached mass on each said shaft;
where the speed of rotation of each rotating shaft of each of said at least two motors is independently changeable in real time;
where said vibrations generated via the rotation of each said attached mass change in real time in accordance with said independently changing speed of rotation of said rotating shafts of said at least two motors;
where said at least two motors generate vibrations simultaneously, wherein the simultaneous vibrations are of independent intensities with respect to each other;
where said vibrations of said simultaneous independent intensities combine in said hand-held game pad controller into a simultaneous combination of vibrations;
where said simultaneous combination of vibrations is felt in both hands of the user holding the hand-held game pad controller.

14. The system of claim 13, where said signals that are generated by said video game system to which said control circuitry is responsive, are communicated via one or more of the following: (1) bi-directional communications; (2) uni-directional communications; (3) wireless communications; (4) wired communications.

15. The system of claim 13, where each motor of the said plurality of motors can be different from each other, in at least one of the following ways: (1) size; (2) shape; (3) power consumption; (4) type; (5) the tactile sensations each can produce when controlled; (6) the desired effect each is adapted produce when controlled; (7) the desired application; (8) the location wherein said actuators are disposed within said control input device; (9) the manner by which said actuators are disposed within said control input device.

16. The system of claim 13, where at least one of said plurality of motors is disposed within a left hand side of said hand-held game controller and predominantly provides tactile sensation to said user's left hand, and at least a second motor of said plurality of motors is disposed within a right hand side of said hand-held game controller and predominantly provides tactile sensation to said user's right hand.

17. The system of claim 13, wherein each of said plurality of actuators may be independently activated, without respect to the independent activation of the other of said actuators, in one or more of the of the following ways: (1) activating for varying durations; (2) activating at varying speeds; (3) activating at varying intensities; (4) activating at varying duty cycles; (5) activating with varying power output parameters; (6) activating via pulse-width modulation; (7) activating with varying electric current; (8) activating with varying electric voltage.

18. The system of claim 13, wherein each of said plurality of motors is disposed within said hand-held game pad controller by any one or more of the following: (1) attachment to an interior surface of said control input device with one or more fasteners; (2) attachment to an interior surface of said control input device with an adhesive; or (3) placement within said control input device by press fitting, snap fitting, or friction fitting.

19. The system of claim 13, where said signals that are generated by said video game system to which said control circuitry is responsive, are generated by software that is executing on said video game system, where said software has been designed to communicate with said control circuitry, where said software is part of the operating system of said video game system, where said software is adapted to create said simultaneous combination of vibrations by independently controlling said at least two independently controllable motors, such that said simultaneous combination of vibrations to be felt in said both hands of said user holding said hand-held game pad controller corresponds to action executing in real time on said video game system.

20. The system of claim 13, where said signals that are generated by said video game system to which said control circuitry is responsive, are generated by software that is executing on said video game system, where said software has been designed to communicate with said control circuitry, where said software is a video game executing on said video game system, where said video game is adapted to create said simultaneous combination of vibrations by independently controlling said at least two independently controllable motors, such that said simultaneous combination of vibrations to be felt in said both hands of said user holding said hand-held game pad controller corresponds to action executing in real time in said video game.

* * * * *

UNITED STATES PATENT AND TRADEMARK OFFICE
CERTIFICATE OF CORRECTION

PATENT NO.       : 8,328,638 B2                                      Page 1 of 1
APPLICATION NO.  : 11/929426
DATED            : December 11, 2012
INVENTOR(S)      : Craig Thorner It is certified that error appears in the above-identified patent and that said Letters Patent is hereby corrected as shown below:

On the cover of the patent, "This patent is subject to a terminal disclaimer." should be deleted.

Signed and Sealed this
Twenty-second Day of January, 2013

David J. Kappos
*Director of the United States Patent and Trademark Office*